United States Patent [19]
Maekawa et al.

[11] Patent Number: 6,040,824
[45] Date of Patent: Mar. 21, 2000

[54] INFORMATION DISPLAY SYSTEM WITH TOUCH PANEL

[75] Inventors: Kazuteru Maekawa; Yukiyoshi Suzuki; Takeshi Yanagikubo, all of Anjo, Japan

[73] Assignee: Aisin AW Co., Ltd., Japan

[21] Appl. No.: 08/885,138

[22] Filed: Jun. 30, 1997

[30] Foreign Application Priority Data

Jul. 31, 1996 [JP] Japan .................................. 8-201982

[51] Int. Cl.$^7$ ..................................................... G09G 5/00
[52] U.S. Cl. ............................ 345/173; 345/121; 345/146
[58] Field of Search .................................. 345/146, 173, 345/121, 174, 178; 340/990, 995, 988

[56] References Cited

U.S. PATENT DOCUMENTS

| | | | |
|---|---|---|---|
| 4,698,625 | 10/1987 | McCaskill et al. ...................... | 345/145 |
| 4,992,947 | 2/1991 | Nimura et al. .......................... | 701/210 |
| 5,539,429 | 7/1996 | Yano et al. .............................. | 345/173 |
| 5,559,707 | 9/1996 | Delorme ................................... | 345/167 |
| 5,627,567 | 5/1997 | Davidson ................................. | 345/173 |
| 5,638,523 | 6/1997 | Mullet et al. ........................... | 345/326 |
| 5,691,747 | 11/1997 | Amano et al. ........................... | 345/145 |
| 5,757,358 | 5/1998 | Osaga ....................................... | 345/146 |

*Primary Examiner*—Steven J. Saras
*Assistant Examiner*—Amr Awad
*Attorney, Agent, or Firm*—Lorusso & Loud

[57] ABSTRACT

An information display system has a touch panel for selecting an item from a plurality of displayed items by touching. Coordinate differences between each of the coordinates of the plurality of displayed items and the touch position coordinates are calculated. The item having the least calculated coordinate difference is the selected item. Subsequent touchings within a predetermined time and distance are determined to be attempts to correct previous erroneous selections causing probabilities of selecting the previously selected items to be reduced, such as by changing relative calculated coordinate differences to favor selection of other items. Alternatively, a next candidate button can be touched to select the item with the next least coordinate difference.

15 Claims, 15 Drawing Sheets

○  Touch Panel Reaction Position
⊘  Landmark Coordinate Position
●  Touch Reaction Position

Intersection Data

| Number of Intersections (n) | |
|---|---|
| | Intersection No. |
| 1 | Intersection Coordinates |
| | Information of Connected Roads |
| | Address & Size of Landmark |
| ⋮ | ⋮ |
| n | |

Landmark Data

| Number of Landmarks (m) | |
|---|---|
| | Landmark Coordinates |
| 1 | Mark Pattern |
| | Faced Road |
| | Landmark Name |
| ⋮ | ⋮ |
| m | |

FIG. 3(a)   FIG. 3(b)

Landmark Drawing Data

0: ○○ Bank Mark Drawing Data
1: ◇◇ Bank Mark Drawing Data
2: □□ Bank Mark Drawing Data
3: △△ GS Mark Drawing Data
4: ▽▽ GS Mark Drawing Data
⋮

FIG. 3(c)

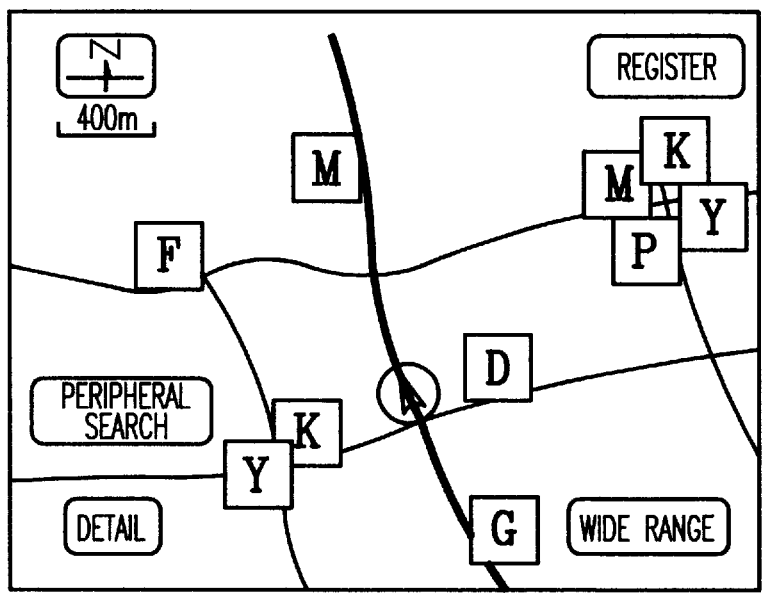
FIG. 6A
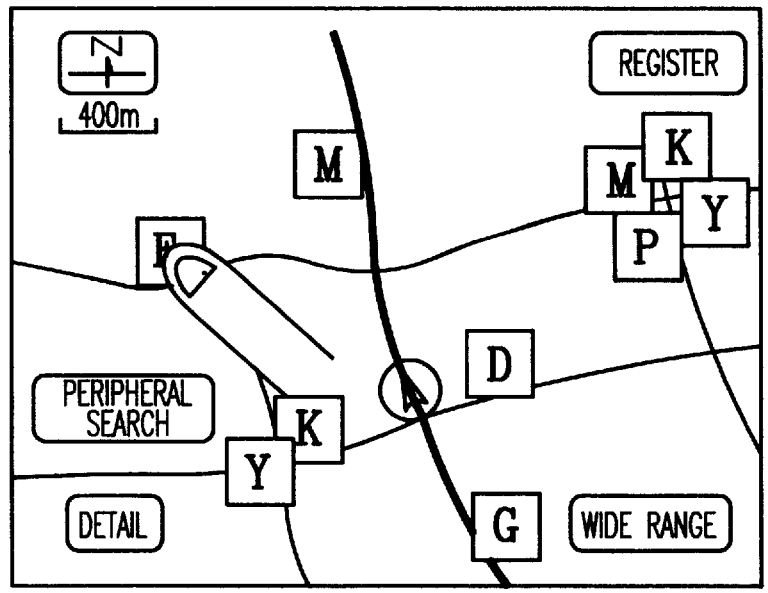
FIG. 6B

○ Touch Panel Reaction Position

⊘ Landmark Coordinate Position

● Touch Reaction Position

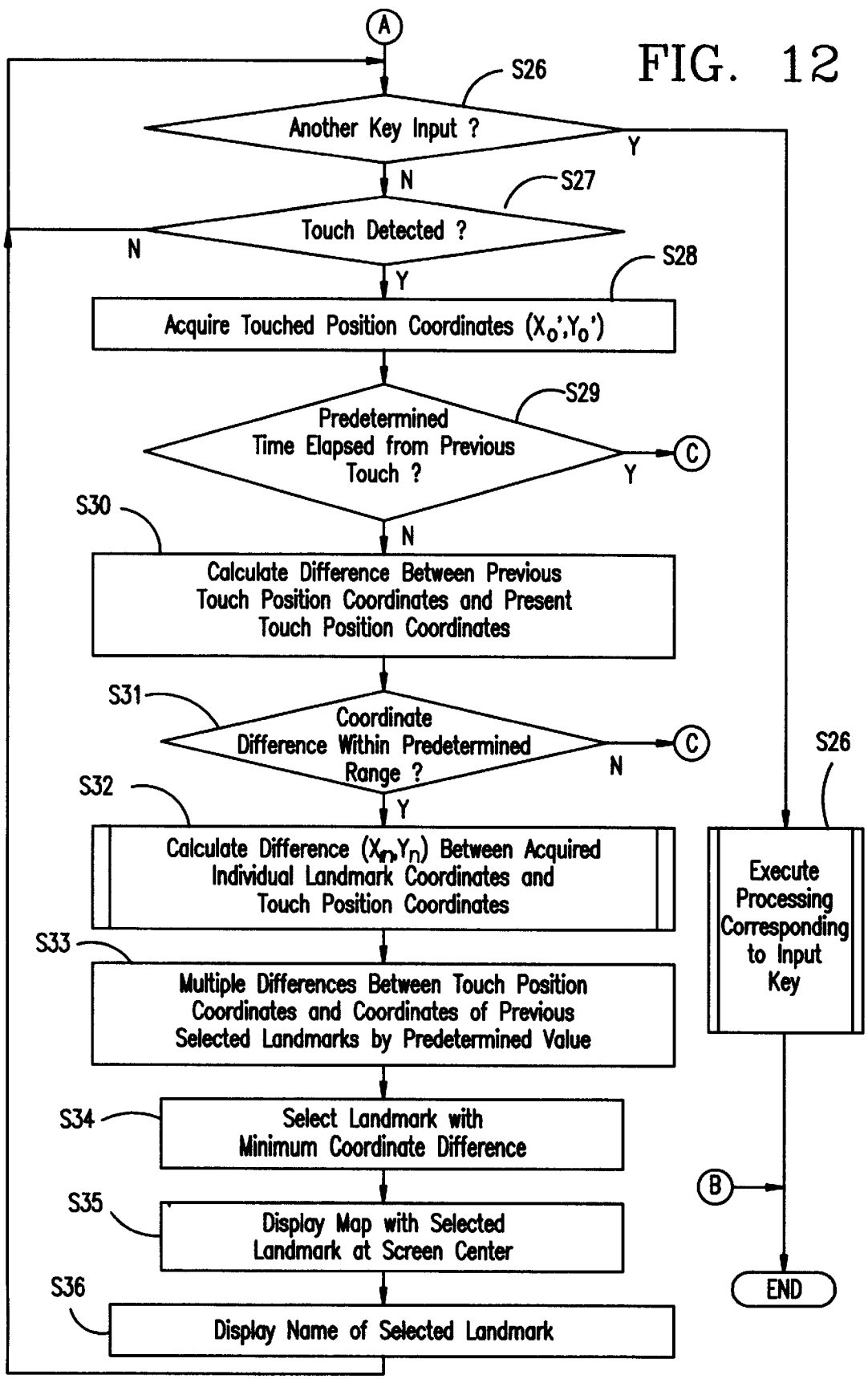

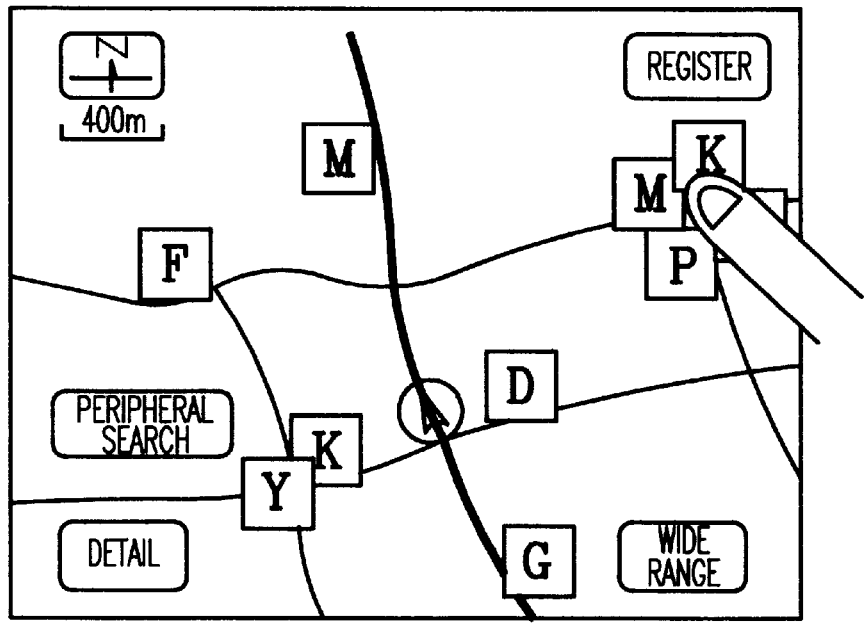
FIG. 13A
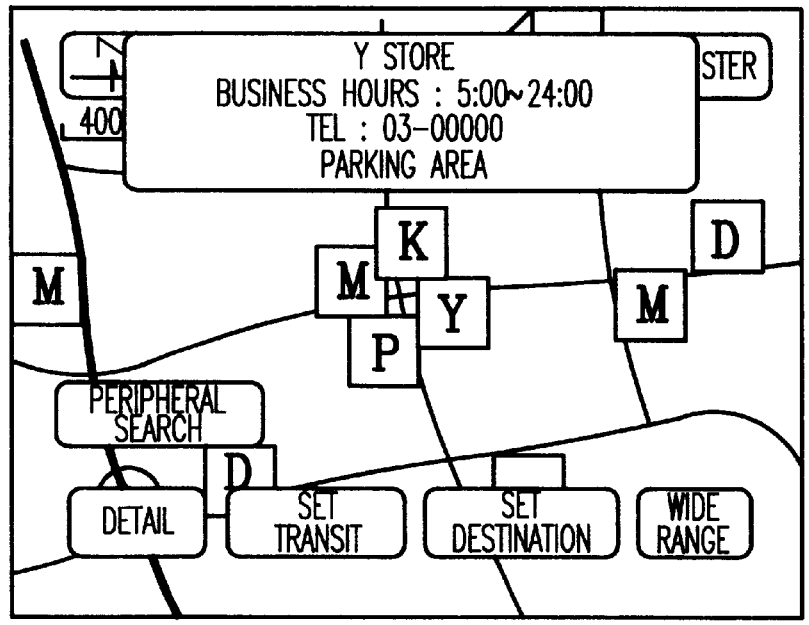
FIG. 13B

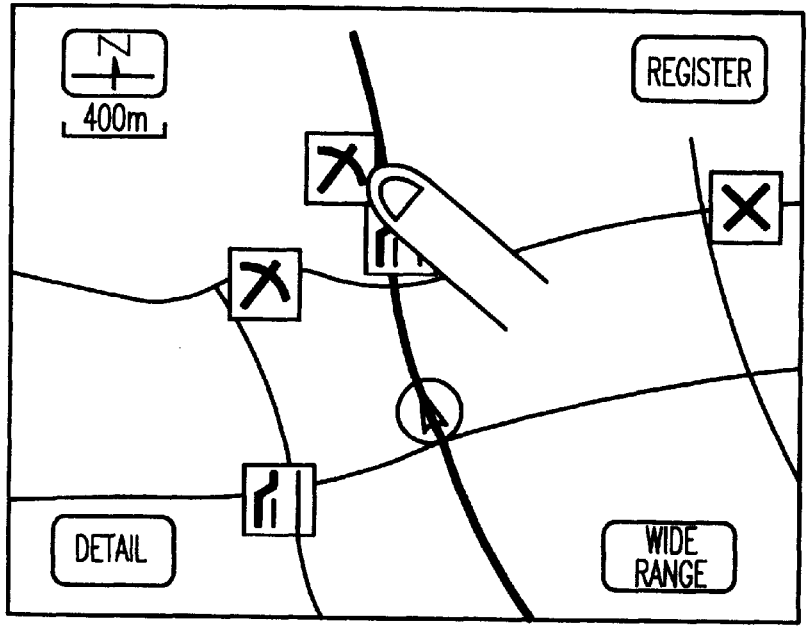
FIG. 14A
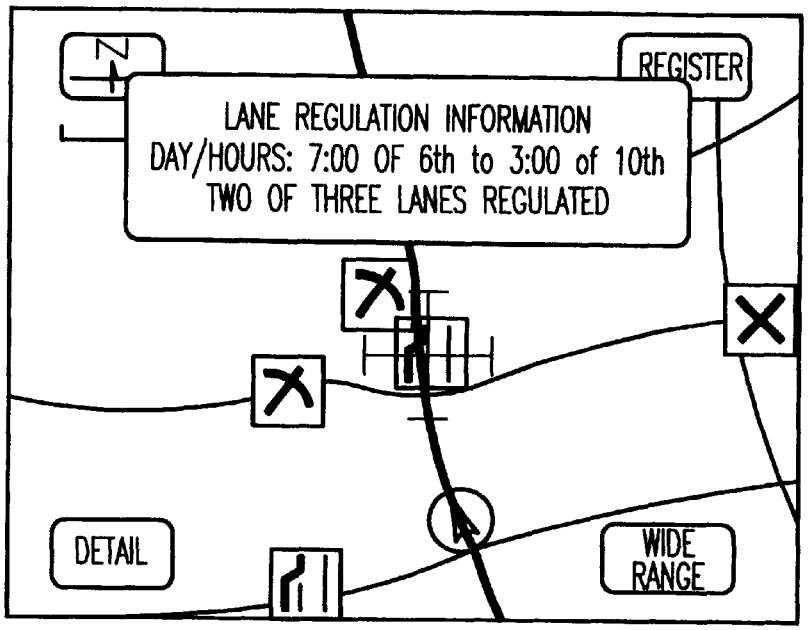
FIG. 14B

INFORMATION DISPLAY SYSTEM WITH TOUCH PANEL

BACKGROUND OF THE INVENTION

1. Field of the Invention

The present invention relates to an information display system provided with a touch panel suitable for a navigation system or the like.

2. Related Art

In prior art information display systems having touch panels, a variety of information such as menu items are displayed on a display unit, and choices are input by manually touching selected items of the displayed information through the touch panel. When a manual touch is detected, the touch position coordinates on the screen are detected to determine which of the items displayed on the screen has been selected, and processing proceeds in accordance with the item which was selected.

In one vehicular navigation system of the prior art, the display unit is provided with a touch panel to make it easier for an operator to make a variety of settings and to present the information while the vehicle is running. If an item of a particular type such as a convenience store, a gas station or a fast food restaurant is selected on the screen of the navigation system, a landmark of the selected type is displayed on the map in the screen so that the user can easily recognize at a glance the location of the shop of the selected type.

In the aforementioned navigation system of the prior art, a displayed landmark can be selected by touching the desired landmark on the display screen to set a transition point or a destination point for the navigation system. However if the displayed map covers an urbane district or a wide area, a plurality of the landmarks may be densely displayed on the display screen.

The method of selecting a displayed landmark by the touch screen is advantageous in that the landmark can be selected by a single touch. However, the item selected by manual touch may be ambiguous (incapable of being determined) if the landmark to be selected is one of a plurality of closely spaced landmarks.

Thus an erroneous selection can result when densely displayed landmarks are selected through the touch panel, as described above. Even when the user recognizes the erroneous selection and repeats the input, the erroneous selection can be repeated if the dense display state is unchanged. Where items to be selected by touch are displayed densely on the display, erroneous selections occur frequently.

SUMMARY OF THE INVENTION

An object of the present invention is to solve the above-specified problems by providing an information display system having a touch panel wherein the system can determine an optimum selected item for the touched position to thus improve the ease of operation.

According to one aspect of the present invention, there is provided an information display system having a touch panel for selecting an item by touch from a plurality of displayed items, wherein the differences between the coordinates of the touched position and the coordinates of the plurality of displayed items displayed on the display screen are calculated, and the selected item is determined to be the one item among the plurality of displayed items having the least calculated coordinate difference from the touched position.

According to a second aspect of the present invention, the plurality of displayed items are marks displayed on the map so that the coordinates of the individual marks are the locations of the marks on the map.

According to third aspect of the present invention, it is further determined whether or not a touch is a selection following an erroneous determination of a selected item, and when it is determined that the present touch is being made to correct a previous erroneous selection, a weighting factor for selection of the previously determined item is lowered.

According to a fourth aspect of the present invention, the determination that a present touch is being made to correct an erroneous selection determined from a previous touch is based on the condition that the present touch is within a predetermined time from the previous touch and that the coordinate difference between the previous and present touch positions are within a predetermined range.

According to a fifth aspect of the present invention, when a determination is made that the present touch is being made to correct an erroneous selected item determined from a previous touch, a value representing the distance between the previously selected item and the present touch position is changed.

According to a sixth aspect of the present invention, wherein the information display system includes a second candidate selecting switch which, when operated, the next item being selected from the displayed items sequentially in the order of increasing coordinate differences.

According to a seventh aspect of the present invention, the items being selected are landmarks or road regulation marks superposed on the map.

According to an eighth aspect of the present invention, selected items including landmarks or road regulation marks can be used as navigation point data.

According to a ninth aspect of the present invention, the selected items are displayed at the center of the screen.

BRIEF DESCRIPTION OF THE DRAWINGS

FIG. 3(a) is a diagram of the structure of a file of intersection data used in the system of FIG. 1;

FIG. 3(b) is a diagram of the structure of a file of landmark data used in the system of FIG. 1;

FIG. 3(c) is a diagram of the structure of a file of landmark drawing data used in the system of FIG. 1;

FIG. 6A is a diagram of a periphery search screen displaying landmarks of the genre "Convenience Store";

FIG. 6B is a diagram similar to FIG. 6A but illustrating selection of a displayed landmark on the screen;

FIG. 12 is a flow chart of a second portion of a procedure performed during a periphery search;

FIG. 13A is a view similar to FIG. 8A but in a modified procedure;

FIG. 13B is a diagram illustrating a peripheral search screen with a selected landmark in densely displayed landmarks in the center in the modified procedure;

FIG. 14A is a diagram showing selection of a item in a further modified landmark selecting screen in which the landmarks are densely displayed;

FIG. 14B is a diagram of a peripheral search screen with a selected landmark in densely displayed landmarks in the center in the further modified landmark selecting screen;

DESCRIPTION OF THE PREFERRED EMBODIMENT

Figure 1:
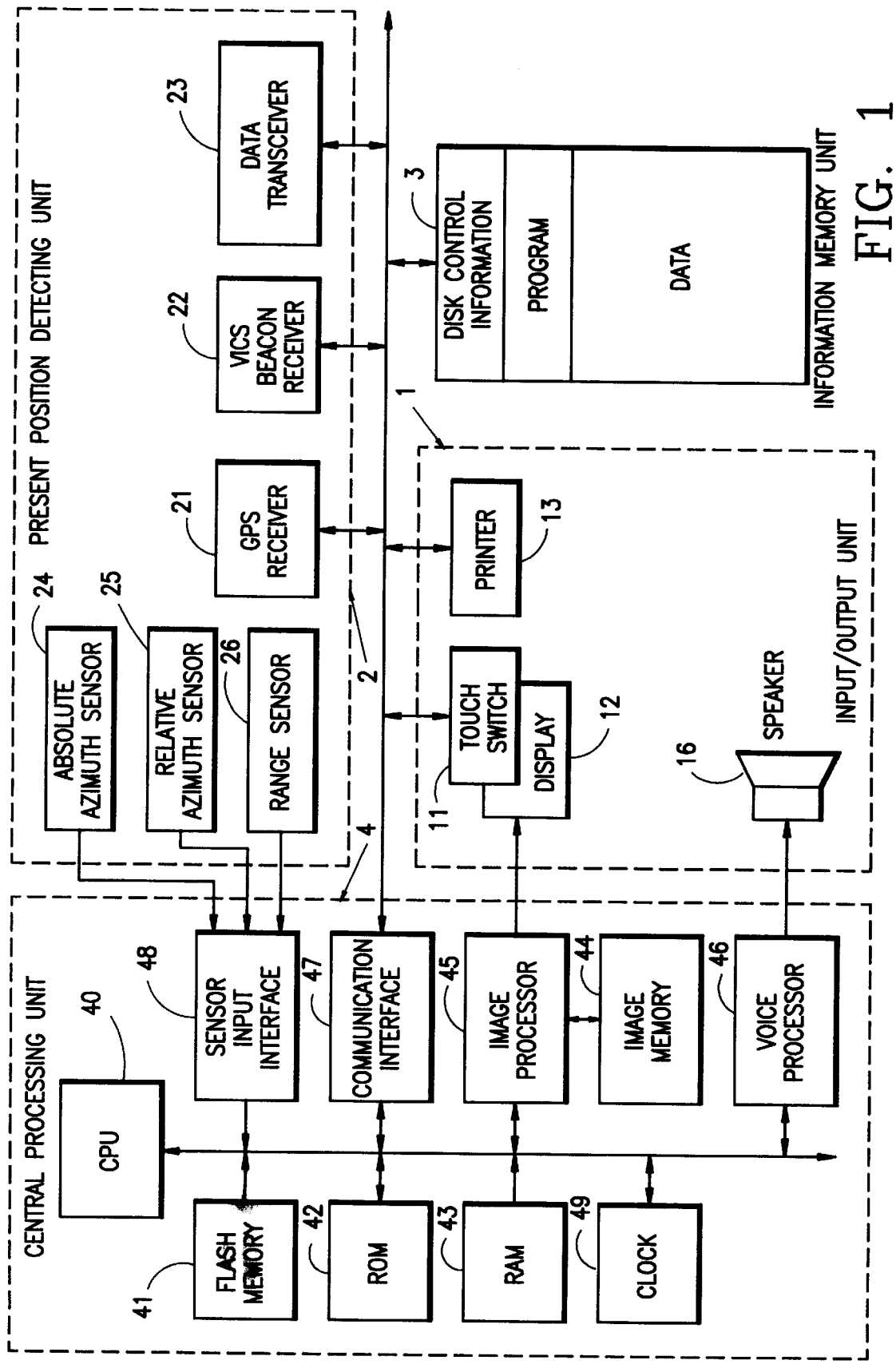
FIG. 1 is a block diagram showing one embodiment of a vehicular navigation system employing an information display system in accordance with the present invention.

One preferred embodiment of the present invention is applied in a vehicular navigation system shown in FIG. 1. The vehicular navigation system includes: an input/output unit 1 for inputting/outputting information on a route guide; a present position detecting unit 2 for detecting information on the present position of a vehicle; an information memory unit 3 having recorded navigation data necessary for calculating the route, display/voice guide data necessary for providing guidance along the route, and application and/or operating system (OS) programs; and a central processing unit 4 for controlling the entire system.

The input/output unit 1 displays navigation and input selection information or items under control of the central processing unit 4, inputs driver selections such as a destination or instructions, outputs guidance information in voice or on the display screen in accordance with the instructions entered by the driver, and outputs processed data to the printer. For performing these functions, the input portion includes a touch switch or screen 11 for inputting the destination in terms of a telephone number or coordinates on a map and for entering instructions such as requesting route guidance. Alternatively, input may be made by an input device such as a remote controller. The output portion includes a display screen 12 for displaying input selection data on the screen and for displaying route guidance information automatically on the screen in response to a request of the driver; a printer 13 for printing data processed by the central processing unit 4 and data stored in the information memory unit 3; and a speaker 16 for outputting audio route guidance.

The input/output unit can also include a voice recognition unit (not shown) for enabling voice input of instructions and destination points; a card or disc reading unit (not shown) for reading data recorded in an IC card or a magnetic card or disc; a data communication unit (not shown) for transferring data between an information center which stories data necessary for navigation to provide the information through communication lines when demanded by the driver; and an information storage device such as an electronic note storing in advance data intrinsic to the driver such as map data and destination data.

The display 12 is a color CRT or a color liquid crystal display, and displays in colors all the screens that are necessary for navigation, such as a line setting screen, a section diagram screen and an intersection diagram screen based upon the map data or guide data processed by the central processing unit 4, and buttons in the corresponding screen for setting the route, for guidance along the route and for switching to another screen. For example, information such as the name of an approaching intersection is popped up and displayed in colors at a suitable time in the section diagram screen.

The display 12 is mounted in the instrumental panel of the vehicle in the vicinity of the driver's seat so that the driver can confirm the present position of his vehicle and can acquire information on the route being traveled by observing the section diagram. The display 12 is equipped with the touch screen 11 having switch elements overlying the displayed function buttons so that the input operations may be executed by touching the button. This input signal generating means, composed of the displayed images of buttons and the overlying touch switch elements, forms the input portion of the hardware.

The present position detecting unit 2 detects or receives information on the present position of the vehicle and includes: an absolute azimuth sensor 24 made of a geomagnetic sensor or the like; a relative azimuth sensor 25 having a steering sensor, a gyro and so on; a range sensor 26 for detecting the distance traveled from the RPM of the wheels; a GPS receiver utilizing the satellite navigation system (GPS); a VICS receiver acting as traffic information acquiring means; and/or a data transceiver 23. The VICS receiver 22 receives road traffic information through FM radio channels, electric beacons or light beacons, and the data transceiver 23 is exemplified by a portable telephone or personal computer for exchanging the information necessary for the navigation with a traffic information center (e.g., ATIS) when demanded by the user.

The information memory unit 3 is an external unit, for example a CD-ROM, having stored programs and data necessary for navigation. The stored programs include a program for searching a route, a program for determining input in accordance with the present embodiment, a program for controlling the display output necessary for video route guidance and for controlling audio output necessary for voice guidance, data necessary for performing the searching, input, output and control functions, and display information data necessary for the route guidance and map display. For example, the stored data includes all the data necessary for the navigation system such as files of map data, search data, guide data, map matching data, destination data and registered point data. Alternatively, the CD-ROM contains only the stored data and the programs are stored in the central processing unit 4.

The central processing unit 4 includes: a CPU 40 for executing a variety of processor or arithmetic operations; a flash memory 41 for receiving and storing programs and data read from the CD-ROM of the information memory unit 3; a ROM 42 with stored programs or procedures for reading stored programs such as checking and updating the programs of the flash memory 41; a RAM 43 for temporarily latching the searched route guide information such as the point coordinates of a set destination, a road name code No. or the data being processed; an image memory 44 for receiving and storing graphic data to be used in generating an image displayed on the screen; an image processor 45 for fetching the graphic data from the image memory 44 in accordance with a display output control signal from the CPU 40 and for processing the graphic data to output video signals to the display; a voice processor 46 for synthesizing or forming analog signals of voice sounds such as words, phrases and sentences, warning sounds or other sounds, as read out of the information memory unit 3 under control of a voice output control signal from the CPU, and for outputting the analog signals to the speaker 16; a communication interface 47 for transferring input/output data to and from the central processing unit 4, the input/output unit 1, the present position detecting unit 2 and the memory unit 3; a sensor input interface 48 for fetching sensor signals from the present position detecting unit 2; and a clock 49 for writing the date and time in the internal diagnosis information. In the route guidance system, the driver can select route guidance by screen display and/or voice output.

Alternatively, the aforementioned program for checking and updating programs in the flash memory may be stored in the external memory 3. The programs for determining input according to the present invention and the other programs for executing the navigation may be wholly stored in a CD-ROM or an external memory medium, or these programs may be partially or wholly stored in the ROM 42 in the central processing unit 4.

The data and programs, when stored in the external memory medium, are input as external signals to and processed by the central control unit of the navigation system so that the various navigation functions can be performed.

In the navigation system, as described above, the flash memory 41 has a relatively large capacity for receiving and storing the programs from the CD-ROM of the external memory unit, and the ROM 42 has a small capacity stored with the programs for starting and reading information and/or programs from the CD-ROM. The flash memory 41 is non-volatile for retaining or latching the stored information even when the power is turned OFF. For starting the CD-ROM, the CPU 40 executes the program in the ROM 42 to check the version of the programs stored in the flash memory 41 and to read the version of the CD-ROM programs from the disk managing information from the information memory unit 3. The loading (or updating) operation of the programs is executed when it is determined that the programs on the CD-ROM are an updated version of the programs in the flash memory 41.

Figure 2:
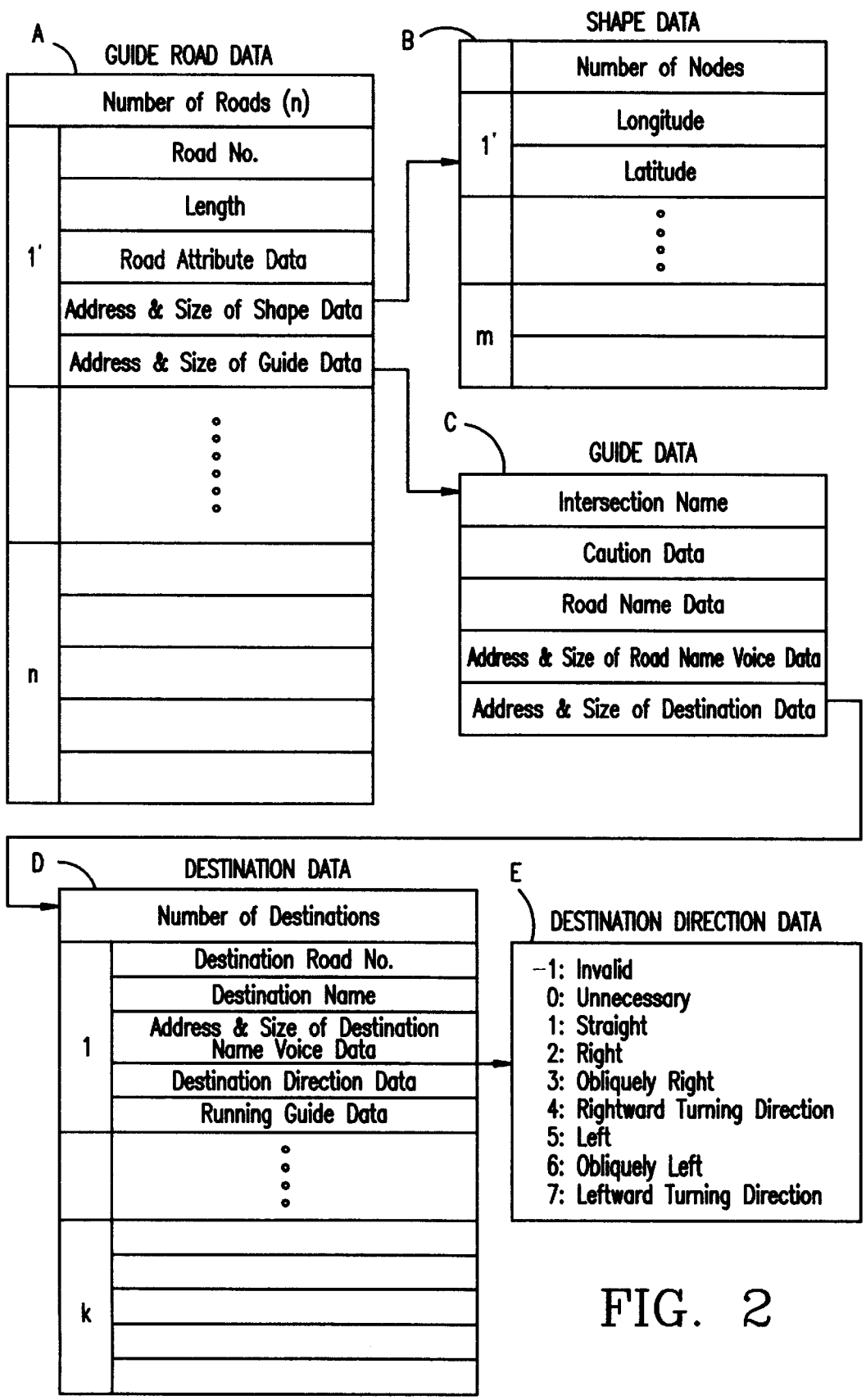
FIG. 2 is a diagram of the structure of files of road data used in the system of FIG. 1.

FIG. 2 shows an example of the structure of major road data files A, B, C, D and E stored in the CD-ROM 3 shown in FIG. 1. File A presents a guide road data file containing stored data necessary for calculating the guidance route, such as data respresenting the road number, the length, the road attribute data, the address and size of the shape data, and the address and size of the guide data of each of n roads. Each road between branch points has separate road numbers for each direction (outward or homeward). The aforementioned shape data includes, as shown in file B, coordinate data of longitude and latitude for the nodes of each road and for m nodes for each road divided by a plurality of nodes into successive road sections.

The aforementioned guide data includes, as shown in file C of FIG. 2, names of intersections (or branch points), caution point data, road name data, the address and size of the road name data, and the address and size of the destination data.

The aforementioned destination data includes, as shown in file D of FIG. 2, the destination road number, the destination name, the address and size of the destination name voice data, the destination direction data and the running guide data. The aforementioned destination name includes a district name. As shown in File E, the destination direction data are data codes indicating invalid (for disusing the destination direction data), unnecessary (for no guidance), straight, right, obliquely right, rightward turning direction, left, obliquely left and leftward turning direction.

FIGS. 3(a) and 3(b) shows data structures of the intersection data and the landmark data, as stored in the CD-ROM 3 of FIG. 1. As shown in FIG. 3(a), the intersection data includes, for each of n intersections, the intersection number, the intersection coordinates (longitude and latitude), information of roads connected to the intersection, and the address and size of the landmarks of the facilities near the intersection on the displayed map. As shown in FIG. 3(b), the landmark data includes, for each of m landmarks, the landmark coordinates (longitude and latitude of the facilities indicated by the landmark), the landmark pattern number, the road faced by the facilities indicated by the landmarks, and the landmark name. As shown in FIG. 3(c), landmark drawing data includes landmark drawing data corresponding to the landmark patterns Nos. 0, 1, 2, - - - , and so on.

Figure 4:
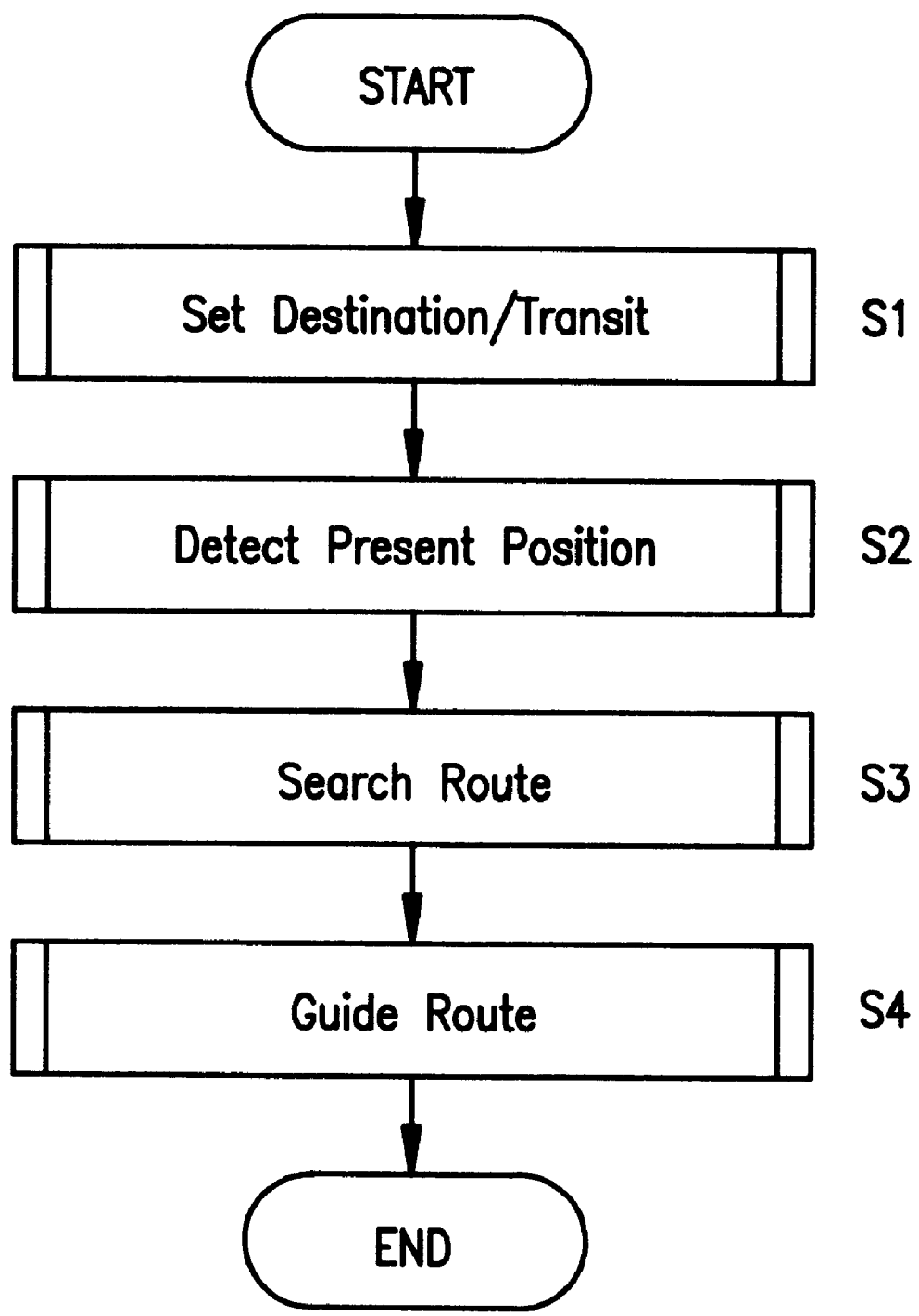
FIG. 4 is a flow chart of the overall operation of the navigation system of FIG. 1.

The navigation process of the entire navigation system is shown in the flow chart of FIG. 4. Initially any updated programs from the information memory unit 3 are read into the flash memory 41 of the central control unit 4 before start of the program for route guidance. The destination is set (at step S1) by entering the target name such as a place or facilities name, a telephone number, an address, a registered point, or a road name. Next, the present position is detected (at step S2) by the present position detecting unit 2 to display a peripheral map around the present position and the name of the present position. The route from the present position to the destination is searched (at step S3). After the route is determined, route guidance (step S4) such as display of map segments with a present position marker thereon is provided until the destination is reached. If a detour setting is input before the destination is reached, a search area including the detour point is set wherein a portion of the route to the destination searched again, and route guidance continues along the modified route until the destination is reached.

Figure 5A:
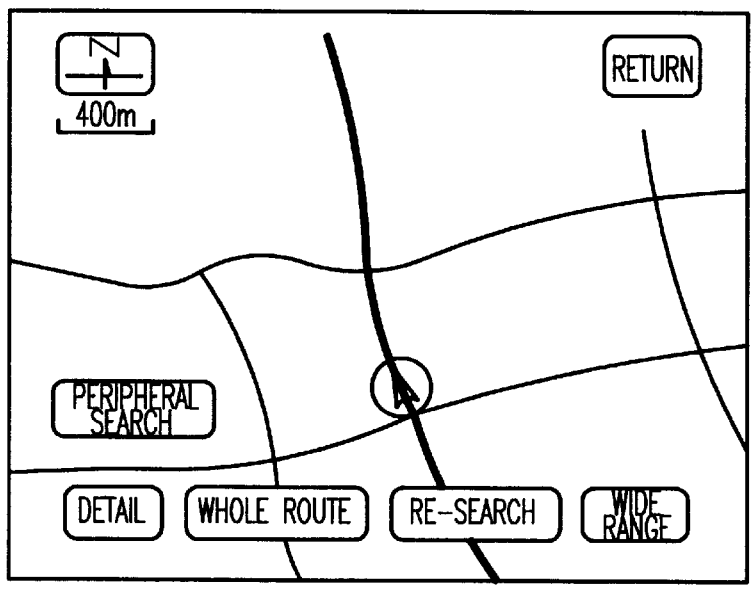
FIG. 5A is a diagram of a display screen showing a present place centralized route guide map.

FIG. 5A shows a road map display screen around the present position marker in the display unit provided with the touch panel. On the screen, several touch buttons or switches are displayed in addition to an azimuth or direction indicating mark and a distance scale unit. The displayed touch switches include a peripheral search touch switch for initiating a search for the facilities around the present position; a detail touch switch for displaying a detailed map; a whole route touch switch for initiating a new search for a route to the destination; a re-search touch switch for the starting a re-search by searching the periphery; a wide-range touch switch for displaying a wide-range map; and a return switch for returning to an initial screen for route guidance.

Figure 5B:
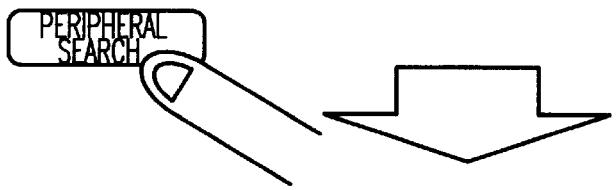
FIG. 5B is a diagram illustrating touching of a menu item to select a peripheral search.
Figure 5C:
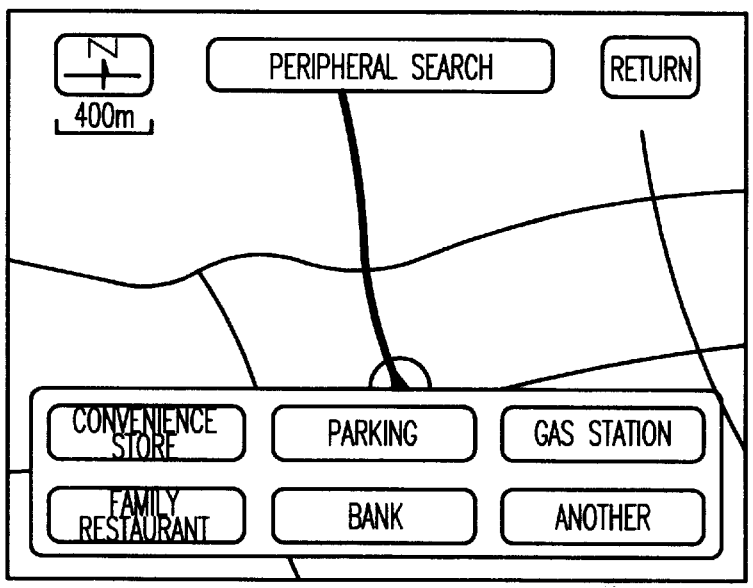
FIG. 5C is a diagram of a display screen displayed in transiting from the map screen of FIG. 5A to a peripheral search.
Figure 5D:
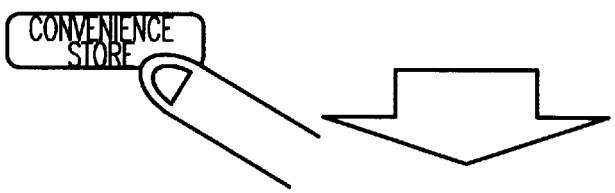
FIG. 5D is a diagram illustrating touching of a menu item to select a genre of "Convenience Store".
Figure 7:
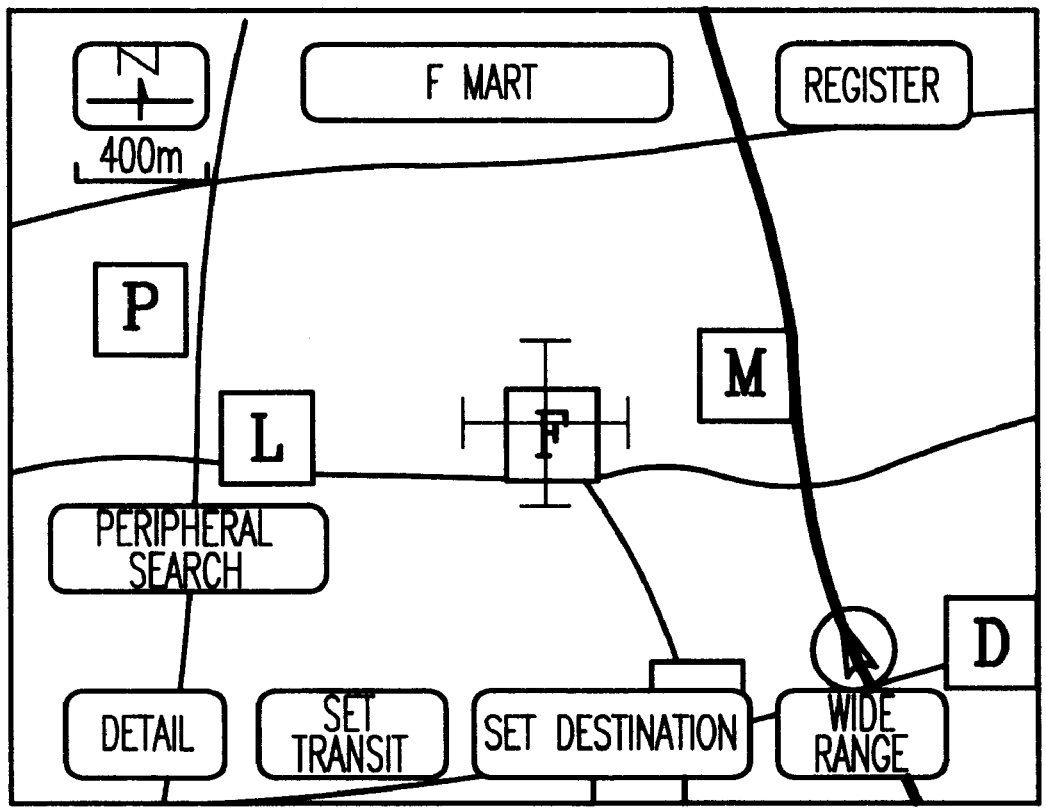
FIG. 7 is a diagram illustrating a peripheral search screen with the selected landmark in the center.

If the peripheral search switch is touched as illustrated in FIG. 5B, the screen of FIG. 5C is displayed wherein the lower portion of the screen shows facility selecting switches such as switches for selecting a convenience store, a parking lot or garage, a gas station, a family restaurant, a bank and so on. For example if the switch convenience store is selected by touching as shown in FIG. 5D, the screen of FIG. 6A is displayed to show landmarks of convenience stores at their locations surrounding the present position. In this method of displaying landmarks, landmarks around the present position in a predetermined region larger than the area displayed on the map screen are acquired by searching the data shown in FIG. 3(b). The acquired landmarks are drawn and superposed on the map screen at their approximate coordinate positions on the basis of the landmark drawing data. If a landmark F is then touched as shown in FIG. 6B, the display screen is changed to the screen shown in FIG. 7 wherein the selected facility, an "F mart" as indicated by the landmark F, is displayed in the road map with the landmark F at the center of the screen. When a set transit switch or a set destination switch is then touched, the facility of the landmark F is set as the transit point or a destination point. A cross mark is displayed over the landmark F as a cursor indicating at its center the point setting position. If instead the register switch in FIG. 7 is touched, the facility, as indicated by the landmark F, is registered as a registered point. If the periphery search switch is touched again in any of the screens of FIGS. 6A, 6B or 7, the facilities selecting switches, as shown in the lower portion of the screen of FIG. 5, are again displayed. If it is desired to return to the preceding screen, the release switch (not shown) is touched. As an alternative to redrawing the screen map to display the selected landmark F at the center of the screen, the screen map may remain the same with the selected landmark indicated an a position not in the center of the screen. Furthermore the screen of FIG. 7, may display the business hours, the business content and/or the telephone number of the facility indicated by the landmark F.

Next, selection by touch switches when the landmarks are densely displayed or closely positioned is described with reference to FIGS. 8A, 8B, 9A, 9B and 10.

Figure 8A:
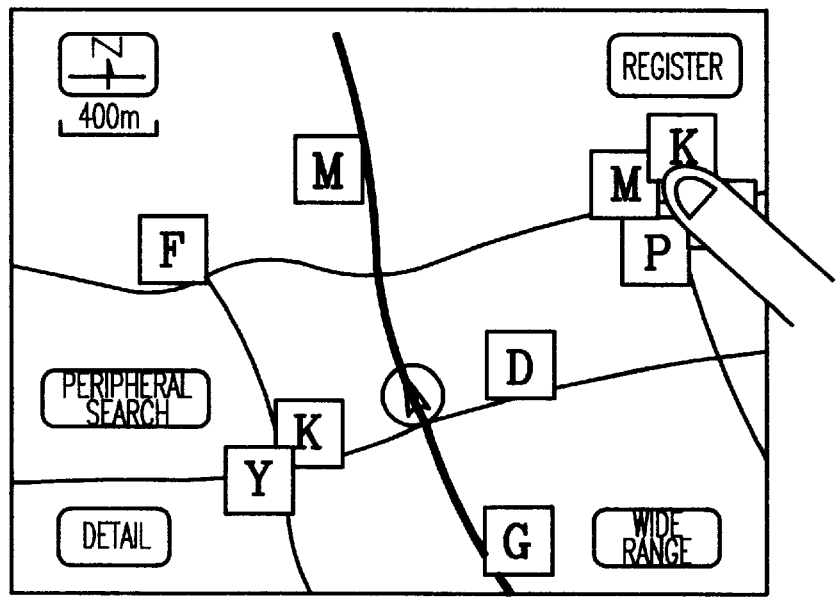
FIG. 8A is a diagram similar to FIG. 6B but illustrating selection of a displayed landmark from densely displayed landmarks.
Figure 8B:
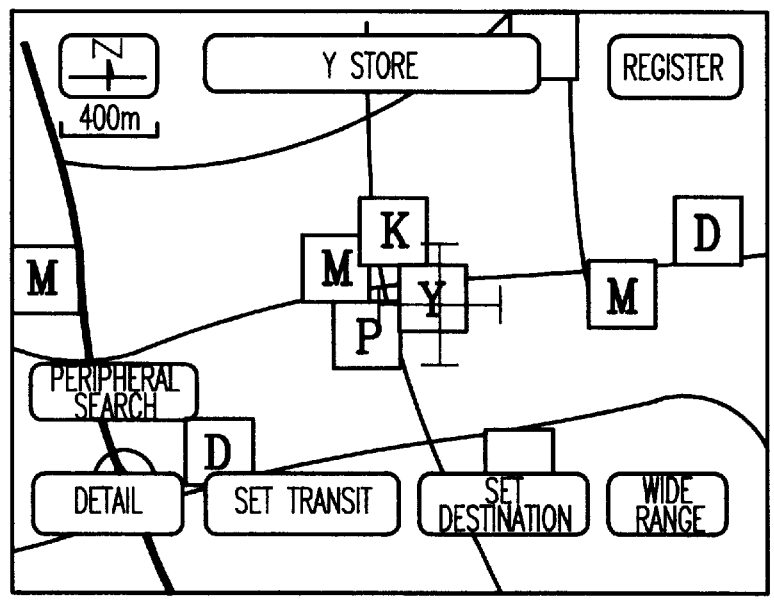
FIG. 8B is a diagram illustrating a peripheral search screen with a selected landmark in densely displayed landmarks in the center.
Figure 9A:
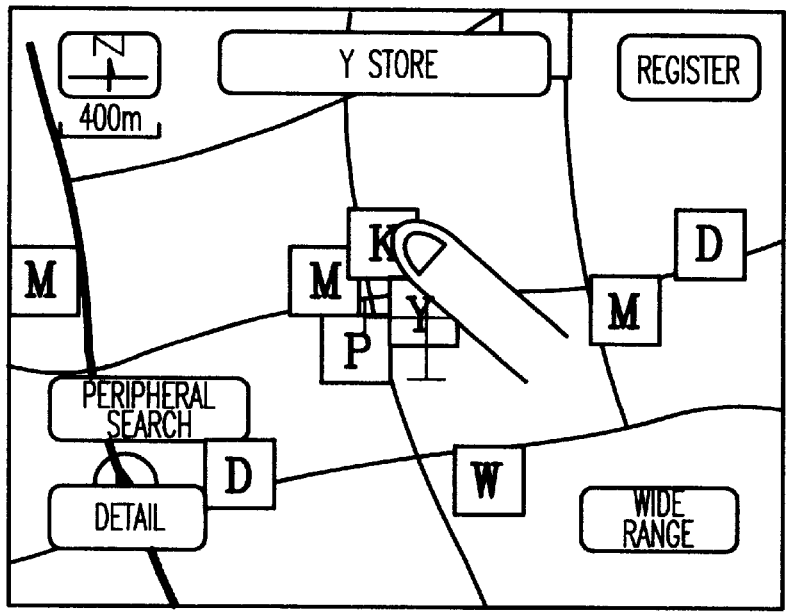
FIG. 9A is a diagram similar to FIG. 8B but illustrating an attempt to correct an erroneous selection of a landmark from a plurality of densely displayed landmarks.
Figure 9B:
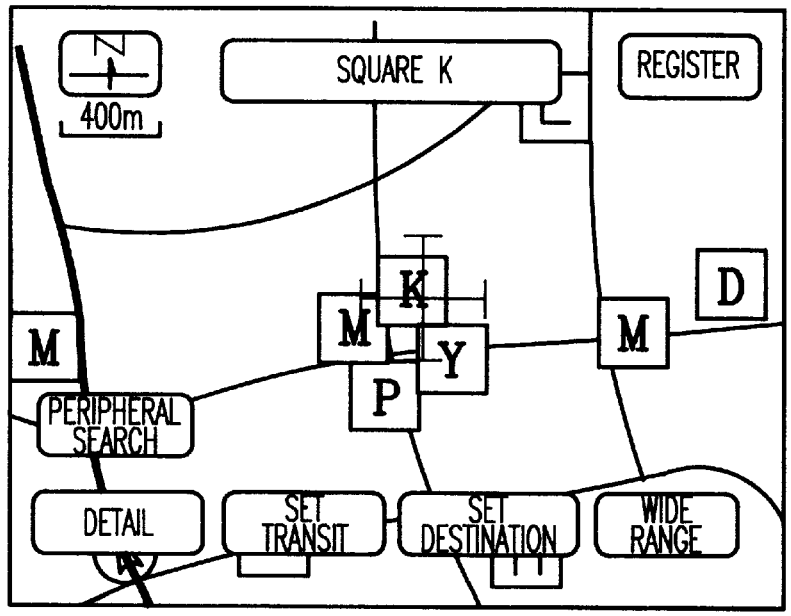
FIG. 9B is a diagram illustrating a peripheral search screen with a corrected selection of a landmark in the center.

FIGS. 8A and 8B show screens after a predetermined item select switch is touched such as one of the facilities select switches of FIG. 5. At the righthand upper portion of screen 8A, there are displayed dense or closely spaced landmarks Y, K, M and P. The driver attempts to select landmark K by touch but as seen in FIG. 8B the landmark Y is erroneously selected. The screen changes with the landmark Y being centered and with the cursor indicating the selection of the landmark Y by being superposed over the landmark Y. If the driver again attempts to select landmark K by touch as shown in FIG. 9A, the probability of selecting the previously selected landmark Y is lowered, and the landmark K is properly selected so that the cursor is displayed over the landmark K. The central processing unit 4 in determining which switch was selected among a plurality of closely spaced switches in one embodiment lowers the probability of selecting the previously selected landmark Y when a subsequent touch is made within a predetermined time to correct an erroneous selection.

Figure 10:
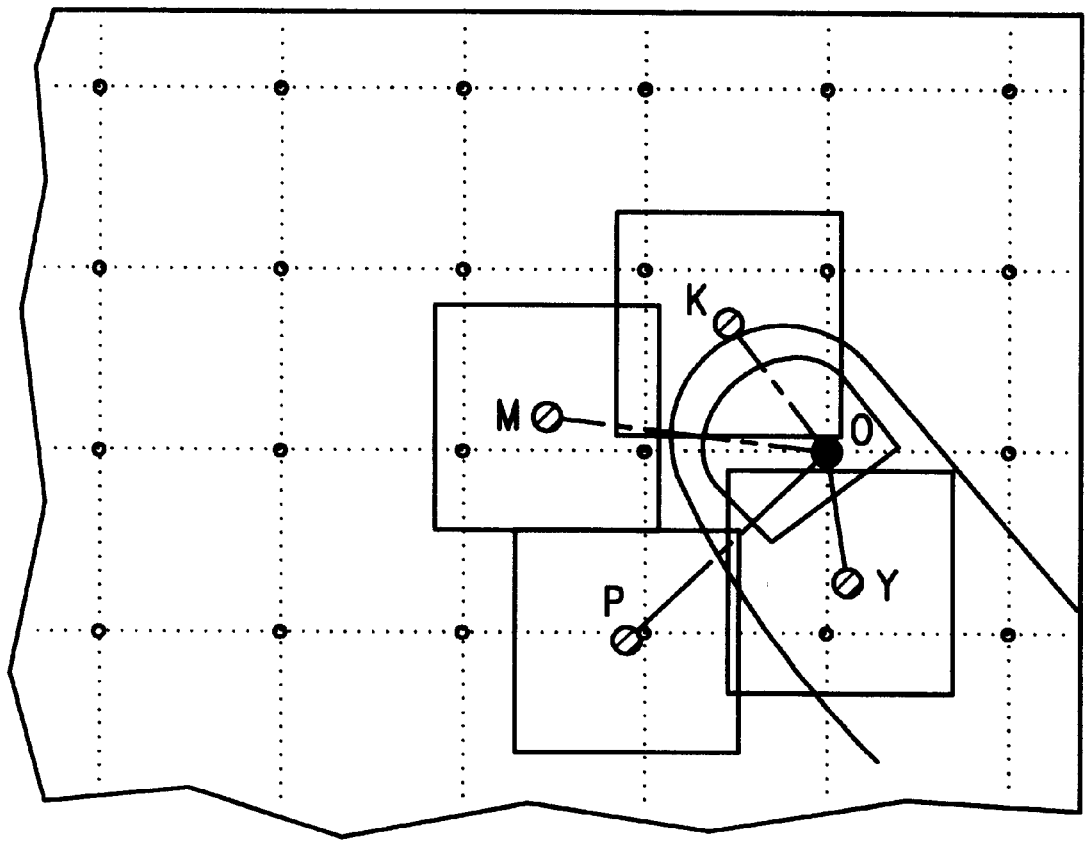
FIG. 10 is a graph showing coordinates of a touch position and a plurality of landmarks during determination of a selected landmark from a plurality of densely displayed landmarks.

In FIG. 10, small black points indicate the reaction or switch contact points of the touch panel forming a grid on the touch panel; hatched circles indicate the landmark coordinate positions Y, K, M and P; and a solid circle indicates a touch reaction point O sensed by the navigation system. The coordinate difference or distance from the detected reaction point O to each of the landmark coordinate positions Y, K, M and P is calculated; these coordinate differences or distances are shown as long-short dashed lines. The landmarks for which coordinate differences are calculated are all within a predetermined square region around the point O. If the landmark Y is the closest landmark to the point O, the landmark Y is selected the first time that the contact of the reaction point O is detected. If a touch is repeated, that is, if contact of a reaction point in the square region around the previously touched point O is detected after release of the previous contact, the distance between the present reaction point and the previously selected point Y is made less likely to be selected by changing the relative calculated coordinate differences such as by multiplying the calculated coordinate difference of the previous selected landmark by a predetermined coefficient greater than one or by adding a predetermined coefficient. As a result, the distance from the reaction point to the target point K is found smallest of the calculated distances so that the landmark K is selected. Where the touch panel reaction points are made fine or close together so as to match the size of the panel region depressed by a finger, as shown, the probability of erroneous selection is low. For coarser touch panel reaction points, however, the probability of erroneous selection is higher that this arrangement is effective especially in the case of more widely space reaction points.

Figure 11:
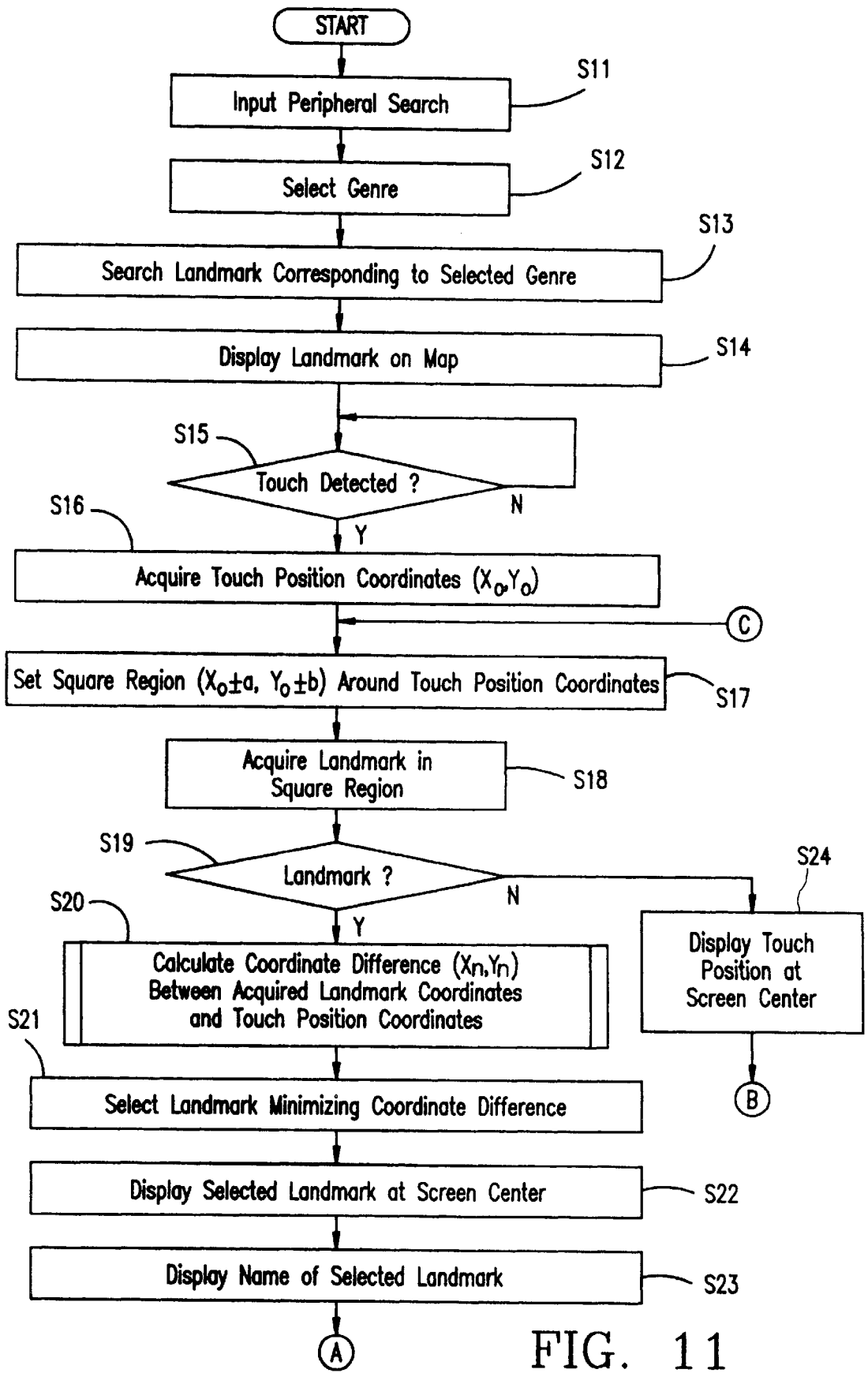
FIG. 11 is a flow chart of first portion of a procedure performed during a periphery search.

In the procedure for periphery searching as shown in FIGS. 11 and 12, operation (touching) of the periphery search key, as illustrated in FIG. 5B, is detected in step S11 of FIG. 11, and the items or types of facilities available for selection are displayed on the screen as in FIG. 5C. When one genre is selected at step S12 from the displayed items, a search is conducted in step S13 for landmarks corresponding to the selected genre with a region of a predetermined size larger than the region displayed on the screen. Then in step S14, the landmarks found within the display region are displayed on a map of the region as shown in FIG. 6A. When a touch is detected in step S15, the touch position (or reaction point) coordinates $(X_0, Y_0)$ are acquired in step S16 and a square region $(X_0 \pm a, Y_0 \pm b)$ around the touch position coordinates is set in step 17. If the landmark coordinates are stored in the latitude-longitude coordinate system, the touch position coordinates are transformed into the latitude-longitude coordinate system of the map. Then all landmarks in the square region are acquired in step S18. If one or more acquired landmarks located in the square region are found in step S19, the coordinate differences (Xn, Yn) between all the acquired landmark coordinates and the touch position coordinates are calculated in step S20 and the landmark with the minimum coordinate difference is selected in step S21 and is displayed at the center of the screen in step S22 along with display of the name of the selected landmark on the screen at step S23. If in step S19 it is found that no landmark is in the square region, the touch position is displayed at the center of the screen at step S24, and the routine is ended.

In step S25 of FIG. 12 following step S23, it is determined if any other key (one of the displayed function buttons of FIGS. 7, 8B) is touched when the selected landmark is displayed together with its name at the center of the screen. If another key is input, the processing for the key operation is executed in step S26, and the routine is ended. In step S27 it is determined of a touch other than a key has been detected. If not, the procedure continues to cycle through steps S25 and S27. When a touch is detected in step S27, the touch position coordinates ($X_0'$, $Y_0'$) are acquired in step S28, and it is determined whether or not a predetermined time has elapsed after the previous touch in step S29. If within the predetermined time, the coordinate difference between the previous touch position coordinates and the present touch position coordinates is calculated in step S30. If this coordinate difference is found within a predetermined range in step S31, the coordinate differences (Xn, Yn) between the acquired individual landmark coordinates and the touch position coordinates is calculated in step S32. Then in step S33 the calculated coordinate difference between the previously selected landmark and the touch position coordinates is multiplied by a predetermined value greater than one. Thus, when the landmark with the minimum coordinate difference is selected at step S34, the previously selected landmark is unlikely to be selected again. The newly selected landmark is displayed at the center of the screen at step S35). The name of the selected landmark is also displayed at step S36, and the procedure returns to step S25 to await another key or touch input. If another key input is to set the destination, for example, the facilities of the selected landmark are set to the destination. If it is found at step S29 that the predetermined time has elapsed from the previous touch or if it is found in step S31 that the touch position are not within the predetermined square region surrounding the previous touch region, the routine shifts back to step S17 of FIG. 11 wherein in another square region is set and the landmarks within this new square region are acquired and displayed with the closest landmark in the center.

In the routine of FIGS. 11 and 12, the function of steps S29, S30 and S31 is to decide whether or not the new touch is being made to correct a previous erroneous selection in response to a previous touch. Moreover, the function of step S33 is to lower the probability of selecting the previous erroneously selected landmark again in step S34. In step 33, the calculated distance between the new touch position and the previous erroneous selected landmark is changed by multiplying the coordinate difference (distance) by the predetermined value to thus increase this calculated distance and render distances between other landmarks and the touch position to more likely be the minimum difference selected in step S34, i.e., the increased calculated distance is less likely to be selected as the minimum distance. The predetermined multiplication value may be changed to raise or lower the selecting probability.

FIGS. 13A and 13B show selection and display of the selected landmark at the center of the screen with detailed information of the selected landmark. If landmark Y of the densely displayed landmarks Y, K, M and P is touched, as shown in FIG. 13A, the landmark Y is displayed at the center of the screen, and the cursor is displayed superposed on the landmark with the name, business hours, telephone number and parking facilities of the selected landmark displayed in the top portion of the screen. If landmarks in the densely packed region of the selected landmark are subsequently touched, the landmarks near the originally selected landmark are sequentially selected when the touching occurs within a predetermined time of the previous touching.

FIGS. 14A and 14B illustrate a selection example in which regulation marks are densely displayed in response to selection of the touch button "another" in FIG. 5D so that construction marks and lane regulating marks are partially overlapped. If a lane regulating mark is selected, the lane regulating mark is displayed at the center of the screen, the cursor is displayed superposed over the lane regulating mark, and lane regulating information such as the date and time of the lane regulation and the content of the regulation are displayed in the upper portion of the screen.

In the foregoing embodiment of a navigation system provided with the touch panel on the display screen, a variety of information can be displayed on the map and can be used as items for selection by touching. Thus many modifications in which the various information is displayed on the display unit provided with the touch panel and used as the items to be selectively touched can be made with departing from the invention. These modifications can be suitably applied to a vehicular display unit having a small display screen.

Figure 15A:
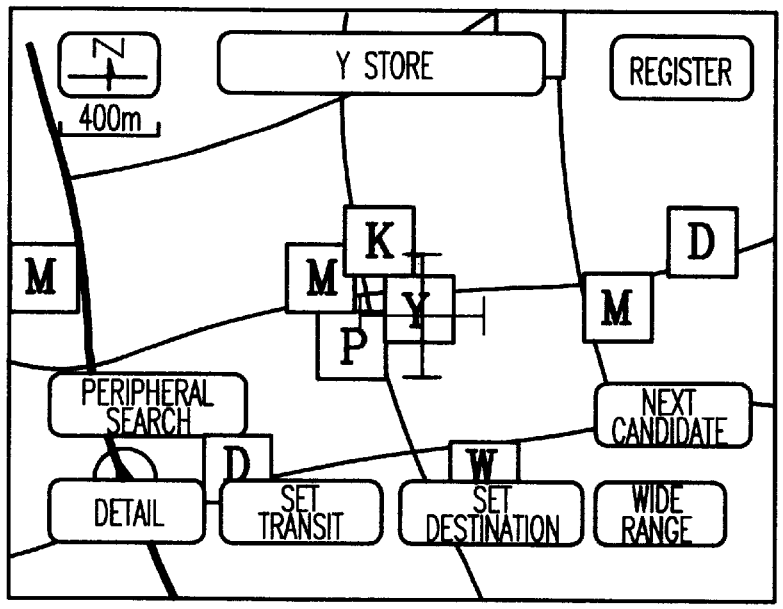
FIG. 15A is a diagram similar to FIG. 8B but employed in still another modified procedure.
Figure 15B:
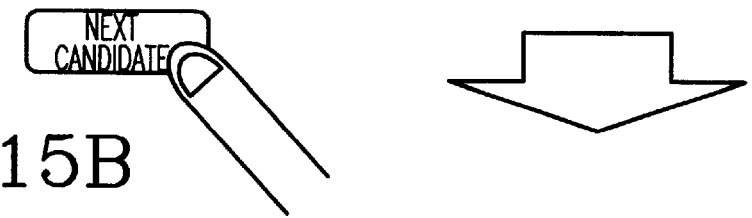
FIG. 15B is a diagram illustrating touching of a menu item "Next Candidate" in the another modified procedure to correct an erroneously selected landmark in densely displayed landmarks.
Figure 15C:
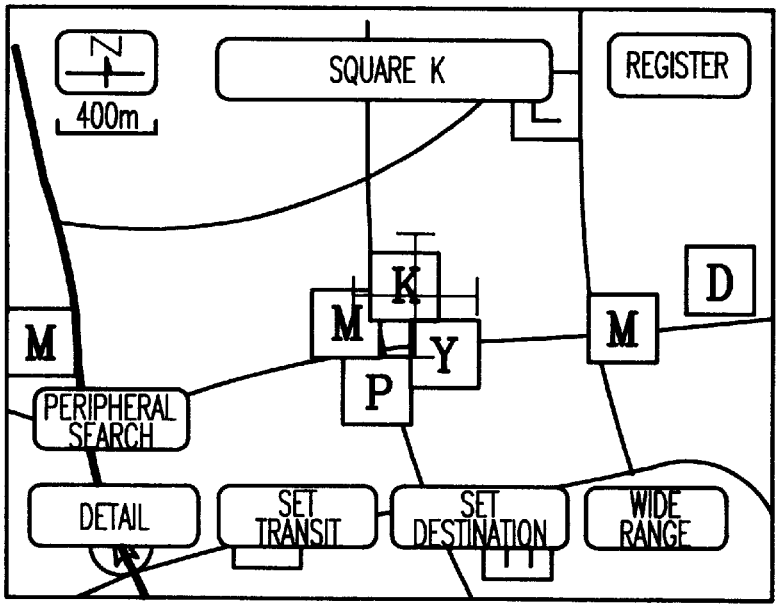
FIG. 15C is a diagram of a peripheral search screen in the another modified procedure with the corrected selected landmark in the densely displayed landmarks in the center.

FIGS. 15A and 15B illustrate another example of the correction of item selection in the periphery search. In this example, a next candidate key is display on the screen. If a desired target landmark is not selected from densely displayed landmarks, the next candidate switch is touched. Then, a next remaining landmark is selected. Continued touching of the next candidate key selects the remaining landmarks sequentially in the order of from smaller to larger coordinate differences until the desired target landmark is set.

Specifically, the touch reaction point coordinates are acquired (as indicated by the point O in FIG. 10), and the predetermined region is set around the reaction point to acquire the landmarks contained in the predetermined region. If a plurality of landmarks are acquired, the coordinate difference between the coordinates of each of the acquired landmarks and the coordinates of the touch reaction point may be calculated and stored in the form of a table sequentially in the order from smaller to larger coordinate differences. In the foregoing example, the next candidate switch is touched to select the stored landmarks in their sequential stored order. Also if the predetermined region set at the first touch is touched again, the next candidate may be selected with reference to the aforementioned table.

According to the present invention, as described hereinbefore, when items (or marks) are displayed for selection by a touch panel, the distances between the facilities represented by the items for selection and the touch position are determined from the coordinates of the facilities and the coordinates of the touch positions on the map so that the closest item is selected. Thus, even when the items are densely displayed, the most proper item can be selected for the touch position.

Especially, by applying the present invention to the map display system or navigation system in which the landmarks are displayed on the map and are touched to display the information thereon or to set their points, the optimum select item for the touch position can be selected even if the landmarks are dense in an urban district or when a map covering a wide range is displayed.

Moreover, if it is determined that an item was erroneously selected, the probability of selecting the previously selected item is lowered so that the once selected item is likely not to be selected again so that the operability is improved.

Especially by applying the present invention to a map display system or navigation system in which landmarks are displayed on the map and are touched to display information thereon or to set their points and wherein the landmarks are displayed so densely such as in an urban district or in a wide range map, the probability of selection again after a previous erroneous selection is reduced to improve the operability.

The entire disclosure of Japanese Patent Application No. 8-201982 filed on Jul. 31, 1996 including specification, drawings, and abstract is incorporated herein by reference in its entirety.

What is claimed is:

1. An information display system for a vehicle navigation system, said information display system having a touch panel for selecting an item by touching the selected item among a plurality of items displayed on a single display screen, comprising storing means for storing display data for displaying the plurality of items including one set of typical coordinates indicating a position for each of the items;

said plurality of items displayed on the display screen being marks displayed on a map so that the coordinates of the displayed items are the locations of the marks on the map;

calculation means for calculating coordinate differences between the typical coordinates for each of the plurality of displayed items and a set of coordinates of a position of a single touch;

select means for selecting the selected item by determining which item of the plurality of displayed items has the least calculated coordinate difference;

deciding means for deciding whether or not a present touch is being made to correct an erroneous selection made from a previous touch; and probability reducing means, responsive to a decision that the present touch is being made to correct an erroneous selection, for reducing a probability of said select means selecting the previously selected item.

2. An information display system according to claim 1 wherein each of said plurality of items is displayed as a two-dimensional item area on the display screen and said coordinate differences are calculated as distances.

3. An information display system according to claim 2 wherein the item areas for said plurality of items touch or overlap.

4. An information display system for a vehicle navigation system, said information display system having a touch panel for selecting an item by touching the selected item among a plurality of items displayed on a single display screen, comprising storing means for storing display data for displaying the plurality of items including one set of typical coordinates indicating a position for each of the items;

said plurality of items displayed on the display screen being marks displayed on a map so that the coordinates of the displayed items are the locations of the marks on the map;

calculation means for calculating coordinate differences between the typical coordinates for each of the plurality of displayed items and a set of coordinates of a position of a single touch;

select means for selecting the selected item by determining which item of the plurality of displayed items has the least calculated coordinate difference;

deciding means for deciding whether or not a present touch is being made to correct an erroneous selection made from a previous touch;

wherein said deciding means decides the present touch to be a correction of an erroneous selection based on conditions that the present touch is within a predetermined time from the previous touch and that the coordinate difference between the previous and present touch positions is within a predetermined range; and probability reducing means, responsive to a decision that the present touch is being made to correct an erroneous selection, for reducing a probability of selecting the previously selected item.

5. An information display system having a touch panel according to claim 4, wherein said probability reducing means reduces the probability of selecting the previous selected item by changing the relative calculated coordinate differences of the previously selected item and the other displayed items to favor selection of one of the other displayed items.

6. An information display system according to claim 5 wherein each of said plurality of items is displayed as a two-dimensional item area on the display screen and said coordinate differences are calculated as distances.

7. An information display system according to claim 6 wherein the item areas for said plurality of items touch or overlap.

8. An information display system according to claim 4 wherein each of said plurality of items is displayed as a two-dimensional item area on the display screen and said coordinate differences are calculated as distances.

9. An information display system according to claim 8 wherein the item areas for said plurality of items touch or overlap.

10. An information display system for a vehicle navigation system, said information display system having a touch panel for selecting an item by touching the selected item among a plurality of items displayed on a single display screen, comprising storing means for storing display data for displaying the plurality of items including one set of typical coordinates indicating a position for each of the items;

said plurality of items displayed on the display screen being marks displayed on a map so that the coordinates of the displayed items are the locations of the marks on the map;

calculation means for calculating coordinate differences between the typical coordinates for each of the plurality of displayed items and a set of coordinates of a position of a single touch;

select means for selecting the selected item by determining which item of the plurality of displayed items has the least calculated coordinate difference; and a second candidate selecting switch, wherein when the second candidate selecting switch is operated, a next item is selected from the plurality of displayed items based on the next least coordinate difference calculated for said single touch.

11. An information display system having a touch panel according to claim 10, wherein the plurality of items displayed on the display screen are landmarks or road regulation marks superposed on the map.

12. An information display system having a touch panel according to claim 11, wherein the points of the selected items including the landmarks or road regulation marks can be located as navigation data.

13. An information display system having a touch panel according to claim 12, wherein the select item is displayed at the center of the screen.

14. An information display system according to claim 10 wherein each of said plurality of items is displayed as a two-dimensional item area on the display screen and said coordinate differences are calculated as distances.

15. An information display system according to claim 14 wherein the item areas for said plurality of items touch or overlap.

* * * * *